United States Patent [19]

Wirth

[11] Patent Number: 4,615,687
[45] Date of Patent: Oct. 7, 1986

[54] ROTARY DRIVE COUPLING

[75] Inventor: Charles J. Wirth, North Canton, Conn.

[73] Assignee: Kamatics Corporation, Bloomfield, Conn.

[21] Appl. No.: 700,460

[22] Filed: Feb. 11, 1985

[51] Int. Cl.[4] .............................................. F16D 3/62
[52] U.S. Cl. ...................................... 464/69; 464/147
[58] Field of Search ....................... 464/69, 81, 84, 98, 464/99, 100, 147

[56] References Cited

U.S. PATENT DOCUMENTS

| | | | |
|---|---|---|---|
| 3,177,684 | 4/1965 | Bossler, Jr. | 464/60 |
| 3,481,158 | 12/1969 | Mayerjak | 464/69 |
| 3,592,021 | 7/1971 | Mayerjak | 464/69 |
| 4,385,895 | 5/1983 | Wirth | 464/69 |
| 4,392,837 | 7/1983 | Wirth | 464/69 |

Primary Examiner—Stuart S. Levy
Assistant Examiner—Daniel P. Stodola
Attorney, Agent, or Firm—McCormick, Paulding & Huber

[57] ABSTRACT

A flexible coupling includes a quadrilateral, flex member, which coupling rotatably couples a driving shaft to a driven shaft and accommodates endwise, parallel or angular misalignment between the shafts. The flex member includes corner portions each having one substantially aligned face and a raised face created by thickening of each corner portion. The substantially aligned faces of two diagonally opposed corner portions face in one generally axial direction and the substantially aligned faces of the other corner portions face in a direction generally opposite to that of the substantially aligned faces of the two diagonally opposed corner portions to minimize the endwise spacing required between the driving shaft and the driven shaft needed to insert the coupling. The decreased endwise spacing minimizes the bending moment on the flex member and facilitates the identification of the proper assembly orientation of the flex member within the flexible coupling. The decreased endwise spacing also increases the lateral stiffness of the coupling arrangement and the maximum operating speed of the coupling.

30 Claims, 12 Drawing Figures

ROTARY DRIVE COUPLING

BACKGROUND OF THE DISCLOSURE

The invention relates to flexible rotary couplings for joining two rotatable shafts or other rotating parts which may have their rotational axes endwise, parallel, or angularly misaligned and deals more particularly with a polygonal flex member within the flexible coupling, which member accommodates the misalignment of the rotating parts and may have a preferred rotational direction of torque transmission. The flexible coupling also includes two adapters, one adapter fixedly attaching the flex member by two diagonally opposed corner portions to one rotatable part and the other adapter fixedly attaching the flex member by another two diagonally opposed corner portions to the other rotatable part, the flex member accommodating any misalignment by bending.

Flexible couplings and flex members of the type with which this invention is concerned are shown in U.S. Pat. No. 3,481,158 to Mayerjak issuing on Dec. 2, 1969; U.S. Pat. No. 4,385,895 to Wirth issuing on May 31, 1983; U.S. Pat. No. 4,392,837 to Wirth issuing on July 12, 1983; U.S. Pat. No. 3,592,021 to Mayerjak issuing on July 13, 1971; and U.S. Pat. No. 3,521,465 to Bossler issuing on July 21, 1970; which are assigned to the assignee of the present invention and hereby incorporated by reference as part of the present disclosure. The flexible couplings disclosed by these patents function without lubrication or backlash, and provide a relatively rigid torque path. They may be used in many types of rotary power transmitting systems, such as in a main drive train or a tail rotor system in an aircraft, a propellor system in a ship or a driving axle in an automobile. The flexible couplings accommodate misalignment resulting from inexact construction of the rotary-power transmitting system and flexing of a frame which houses the two shafts or rotating parts due to external forces applied to the frame.

Many of the flexible couplings disclosed by these patents include a flex member comprising four flex legs or flexing elements and four corner portions which form a rectangle, and two adapters, which interface the flex member to the two rotating parts. Each adapter includes two diametrically opposed ears, which attach at one end to a rotatable shaft, and at the other end to diagonally opposed corner portions of the flex member, any misalignment of the shafts being accommodated by bending of the flex member.

The flexible coupling of U.S. Pat. No. 3,592,021 is rectangular and assembled and oriented with respect to the driving and driven shafts and a preferred rotational direction of torque transfer such that the two shorter flex legs are maintained in compression, and the two longer flex legs are maintained in tension, the shorter length of the compressional flex legs serving to stiffen the compressional flex legs to resist bowing caused by column loading. In addition, the compressional flex legs are manufactured to have a greater thickness than the tensional flex legs also for the purpose of reducing the bowing of the compressional legs. The bowing causes vibrations and limits the maximum torque which the flexible coupling may transmit and the maximum speed at which the flexible coupling may operate. The tensional flex legs are made thinner and longer so that the flex member as a whole can bend enough to accommodate an acceptable level of misalignment between the driving shaft and the driven shaft.

Each corner portion of the U.S. Pat. No. 3,592,021 flex member is thickened relative to the adjacent legs so that each face is raised relative to the adjacent flex legs to strengthen the corner portions and distribute the torque applied by the adapters. However, the thickness of the corner portions causes an additional spacing between the adapters and therefore increases the bending moment on the flex member and the bowing of the compressional flex legs. In general, the increased spacing between the adapters reduces the lateral stiffness of the coupling as compared to a flex member not including such thickened corner portions. Decreasing the lateral stiffness of a flexible coupling lowers the operating speed capacity of the coupling.

The flex member disclosed in U.S. Pat. No. 4,392,837 is also rectangular and oriented in relation to a driving shaft moving in a preferred rotational direction such that the shorter pair of flex legs are maintained in compression and the longer pair are maintained in tension. As with the U.S. Pat. No. 3,592,021 flex member, the corner portions of the U.S. Pat. No. 4,392,837 flex member are thickened causing each face to be raised; however, all the flex legs of the U.S. Pat. No. 3,592,021 flex member have the same thickness.

Flex members coupled to a driving shaft having a preferred direction of torque transfer may also be square with the two compressional legs made thicker than the tensional legs.

It has been found that asymmetrical flex members of the type used to transmit torque in a preferred direction of rotation or to transmit considerably more torque in one direction than in the other direction are sometimes installed improperly because the difference in length or thickness between the tensional and compressional elements may be small and not easily recognized by an assembler or installer. If the flex member is assembled or installed 90° from the proper orientation, the originally intended pair of tensional flex legs receives the main compressional forces and vice versa. Consequently, the flexible coupling has greatly decreased torque capability and increased vibration.

Figures 3, 4:
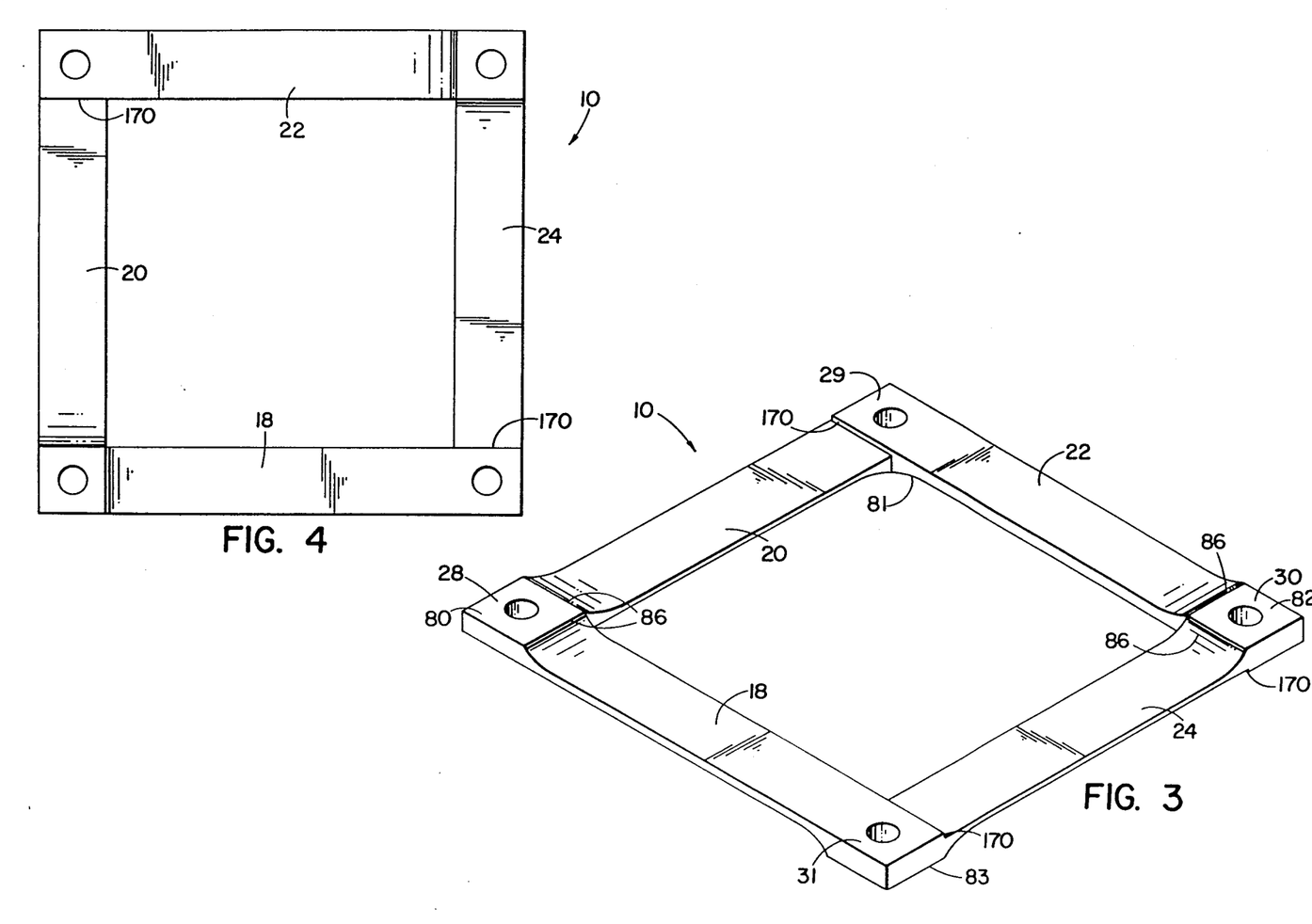
FIG. 3 is a perspective view of a flex member of the flexible coupling of FIG. 2.
FIG. 4 is a top view of the flex member of FIG. 3.
Figure 5:
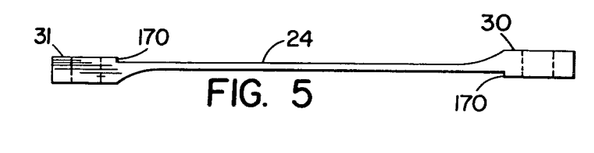
FIG. 5 is a side view of a tensional, flex leg and adjacent corner portions of the flex member of FIG. 3.
Figure 6:
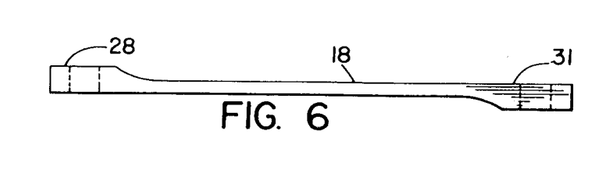
FIG. 6 is a side view of a compressional, flex leg and adjacent corner portions of the flexible member of FIG. 3.

U.S. Pat. No. 3,177,684 to Bossler shows, in his FIG. 3, four-sided flex members arranged to form two helixes intertwined with one another, each flex leg of the four-sided flex members having apparently equal dimensions except for a flex member which interfaces an adapter of a driving shaft and another flex member which interface an adapter for a driven shaft. Two diagonally opposed corner portions of each of these interfacing flex members are raised, although not apparently thickened, to engage the associated adapters. The two helixes appear symmetrical to one another and presumably are designed to transmit an equal amount of torque in each rotational direction.

Accordingly, a general aim of the invention is to provide means for strengthening the corner portions of a polygonal flex member used to transmit torque between two rotatable shafts or parts, the torque being applied to said corner portions, yet provide a torsionally rigid member having a small bending moment.

An additional aim of this invention is to provide increased lateral stiffness in a flexible coupling, by reducing the axial spacing between driving and driven members, with the benefit thereby increasing the operating speed capacity of that coupling.

A more specific aim of the invention is to provide a quadrilateral flex member having strengthened corner portions, pairs of differently dimensioned legs and which flex member is further so constructed that after assembly in a coupling the correctness of its orientation with respect to differences in its legs and the preferred direction of rotation can be checked by a simple inspection procedure.

Another general aim of the invention is to provide a flexible coupling incorporating a flex member of the foregoing type.

SUMMARY OF THE INVENTION

The invention generally resides in a flexible, rotary coupling used to transmit torque from a rotating part such as a driving shaft to another rotating part such as a driven shaft, and accommodate some misalignment between the two shafts. The invention resides more particularly in an improved flex member within the coupling which accommodates the misalignment between the shafts and minimizes the endwise spacing required between the shafts to insert the flex member and therefore minimizes the bending moment on the flex member.

One flex member embodying the invention is quadrilateral in shape having four flex legs and four corner portions, the corner portions and flex legs having two faces each. One face of each corner portion is substantially aligned with the adjacent faces of the adjacent flex legs and the other face of each corner portion is raised and offset relative to adjacent faces of the adjacent flex legs due to the thickening of the corner portions, the substantially aligned faces of two diagonally opposed corner portions and the corner portion being thicker than the flex legs for reinforcement, face in the same general direction, and the substantially aligned faces of the other two diagonally opposed corner portions face in a direction generally opposite to that of the other substantially flat faces.

The flexible coupling also includes an adapter which fixedly attaches to the substantially aligned faces of the first said two diagonally opposed corner portions and to the driving shaft, and includes another adapter which fixedly attaches to the substantially aligned faces of said other two diagonally opposed corner portions and to the driven shaft. With the fixed attachments to the driving and driven shafts, the flex member accommodates misalignment between the driving and driven shafts by bending of itself.

DETAILED DESCRIPTION OF THE PREFERRED EMBODIMENTS

Figure 1:
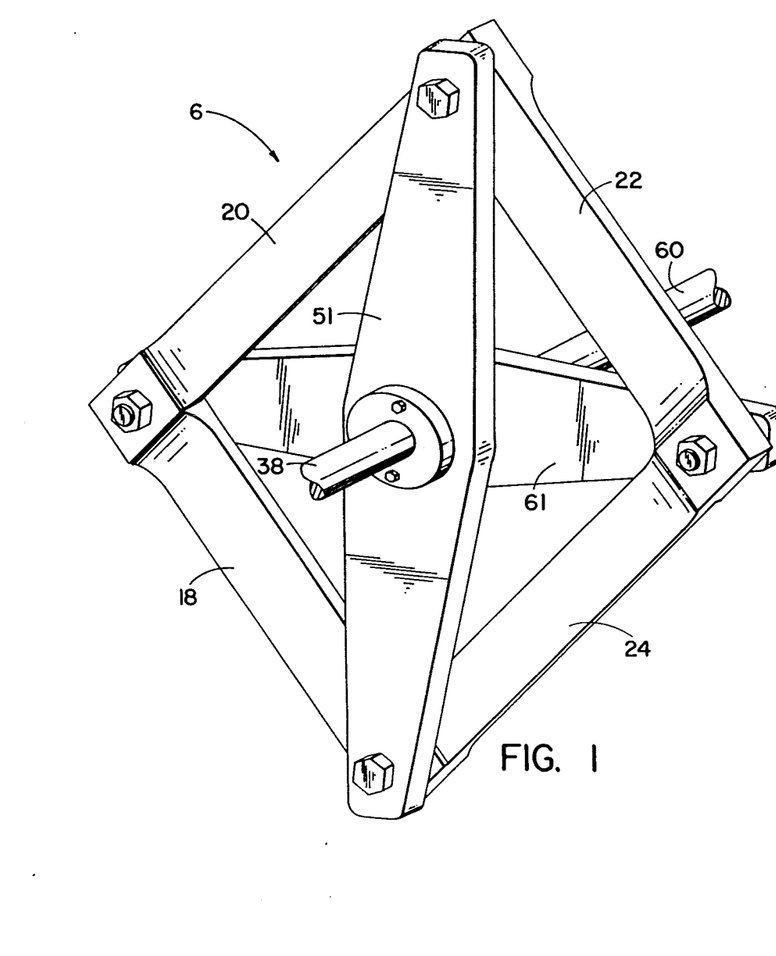
FIG. 1 is a perspective view of a flexible coupling embodying the present invention.
Figures 2, 9:
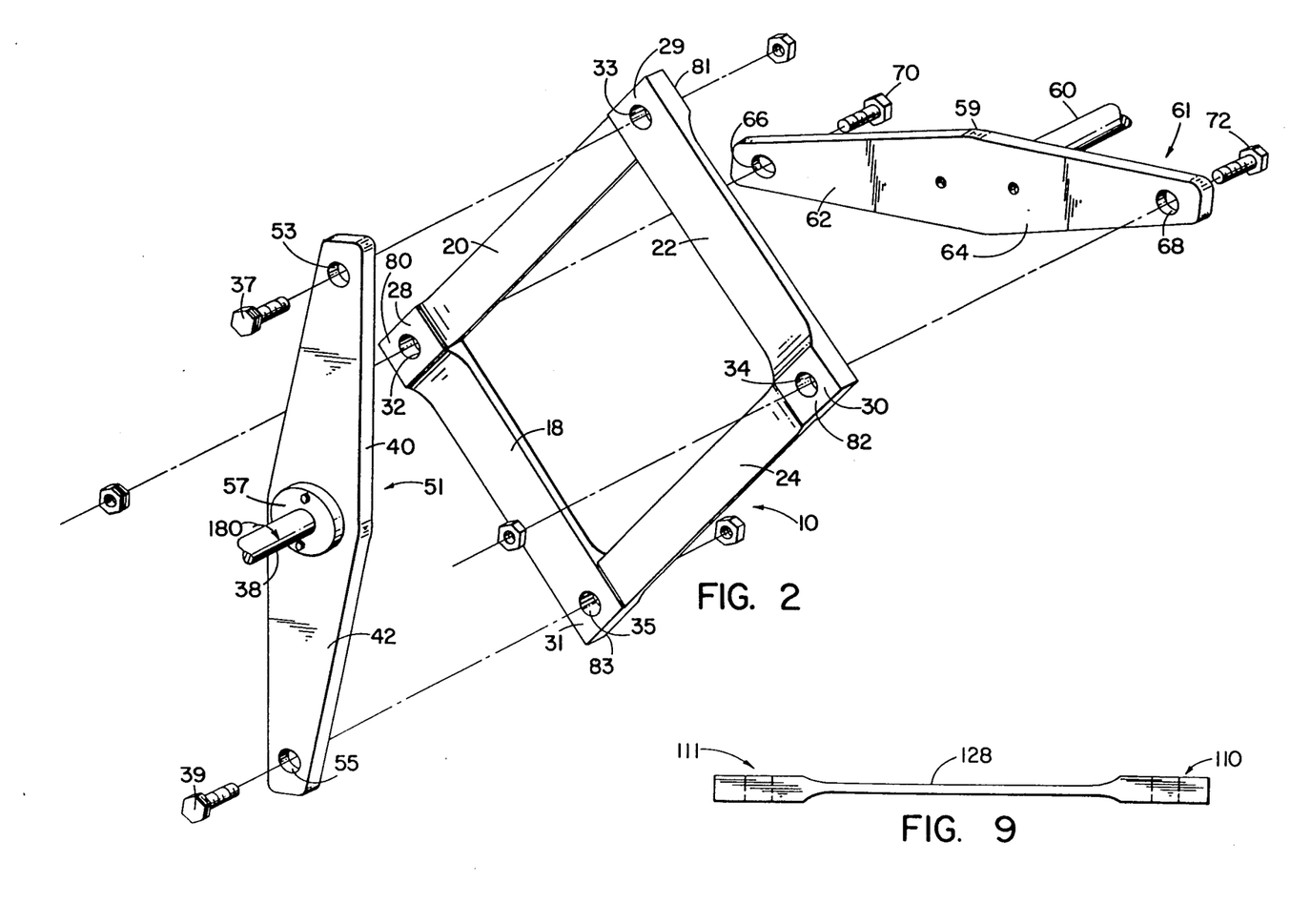
FIG. 2 is an exploded view of the flexible coupling of FIG. 1.
FIG. 9 is a side view of a flex leg and adjacent corner portions of the flex member of FIG. 8.

FIGS. 1 and 2 show an asymmetrical, flexible rotary coupling generally designated 6 embodying the present invention. The coupling 6 is mounted between a driving shaft 38 and a driven shaft 60 and includes a flex member 10, an adapter 51 which connects the flex member to the driving shaft 38, and an adapter 61 which connects the flex member 10 to the driven shaft 60. The driving and driven shafts are slightly misaligned, the misalignment being accommodated by the flexible coupling 6.

The flex member 10 includes four corner portions 28, 29, 30, and 31 and four elongated flex elements or legs 18, 20, 22, and 24 fixedly joined together at the corner portions to form a unitary, generally planar square arrangement. All of the flex legs are made of flexible plastic, metal or other material, for example, maraging steel heat-treated to 250 KSI. The flex legs 18, 20, 22, 24 are preferably made as a single unit by cutting and machining the member 10 from a piece of suitable material or possibly made by a casting or molding process. Each corner portion 28, 29, 30, and 31, has an aperture 32, 33, 34, and 35 respectively.

The adapter 51 include two flat, diagonally opposed ears 40 and 42 having apertures 53 and 55 respectively near the tips of the ears, and the adapter 61 includes two flat diagonally opposed ears 62 and 64 having apertures 66 and 68 near the tips of these ears. The apertures 53 and 55 align with the diagonally opposed apertures 29 and 31, respectively, of the flex member 10, and bolts 37 and 39 fixedly attach the adapter 51 to the corner portions 33 and 35 of the flex member 10, and the apertures 66 and 68 align with the diagonally opposed apertures 32 and 34 respectively, and bolts 72 and 70, fixedly attach the adapter 61 to the corner portions 28 and 30 of the flex member 10.

To install the flexible coupling 6 between the shafts 38 and 60, the adapter 51 may be bolted to a radial flange 57 which is fixedly attached by a spline joint to the driving shaft 38, and the adapter 61 may be bolted to a radial flange 54 which is fixedly attached by a spline joint to the driven shaft 60, the misalignment between the driving shaft 38 and the driven shaft 60 being accommodated by bending of the flex member 10.

The shaft 38 usually rotates in a direction as indicated by an arrow 180 and in so doing, transmits torque in a corresponding direction to the adapter 51, the flex member 10, the adapter 61, and the driven shaft 60. Under such driving conditions, the flex legs 18 and 22 are maintained in compression, and the flex legs 20 and 24 are maintained in tension. The compressional forces on the legs 18 and 22 tend to bow the legs 18 and 22 due to column loading, and the bowing of the compressional flex legs causes deformation of the tensional flex legs.

As shown in FIGS. 2, 3, 5, and 6, the compressional flex legs 18 and 22 are thicker than the tensional flex legs 20 and 24. The increased thickness of the compressional legs makes them capable of withstanding greater compressional and other forces and thereby capable of transmitting more torque than would be the case if the compressional legs had the same thickness as the tensional elements. The exact dimensions of the flex legs 18, 20, 22, and 24 depend on the application of the flex member 10. However, a flex member which can accommodate up to one degree of angular misalignment and 1/16″ of endwise misalignment and transmit 2600 foot pounds at 1600 RPM may be made of heat treated maraging steel and have the following dimensions:

compressional legs 18 and 12:
0.107″ thick, 0.970″ wide, 3.933″ long measured between corner portion apertures
tensional legs 20 and 24:
0.091″ thick, 1.000″ wide, 3.933″ long measured between corner portion apertures
corner portion thickness:
0.175″.

The difference in thickness between the compressional flex legs and the tensional flex legs in this example is not great because this particular flex member is designed to transfer a substantial amount of torque in the "non-preferred" direction, as well as the larger specified torque in the preferred direction.

As shown by the FIGS. 1–3 and 5–6, the corner portions 28, 29, 30 and 31 have substantially aligned faces on one side which are substantially aligned with adjacent faces of the adjacent flex legs 18 and 30, 20 and 22, 22 and 24, and 24 and 18, respectively, and raised and offset faces 80, 81, 82 and 83 respectively, on the other side due to thickening of the corner portions. Each substantially aligned face of the respective corner portions of the flex member 10 totally aligns with the adjacent face of the adjacent compressional leg and is slightly raised and offset as shown by steps 170,170 from the adjacent face of the adjacent tensional leg, because the tensional legs are thinner than the compressional leg. The center axes of all of the flex legs lie in one plane so that the steps 170,170 each having a height equal to one-half times the difference between the thickness of the compressional legs and the thickness of the tensional legs. In the illustrated embodiment, each corner portion has been integrally formed as a single unit with itself and with the other portions of the flex member 10; however, it is possible to make corner portions originally aligned with adjacent faces of adjacent flex legs and reinforce each one with a plate welded onto one face of each corner portion. Each raised face tapers according to sloped portions 86,86 to the thicknesses of the adjacent flex legs, which have a generally rectangular cross-section. The thickening of the corner portions strengthens and reinforces the flex member 10 so that the corner portions will not fail due to the concentration of forces there, such forces being dispersed throughout the flex legs.

When the flexible coupling 6 is properly assembled and installed, the substantially aligned faces of the diagonally opposed corner portions 29 and 31 abut the ears 40 and 41, respectively, and face in one general direction, and the substantially aligned faces of the corner portions 28 and 30 abut the ears 62 and 64 respectively and face in a direction generally opposite that of the substantially aligned faces of the corner portions 29 and 31. The proper assembly orientation should be obvious to an assembler from the location of the raised faces and/or substantially aligned faces of the corner portions of the flex member 10. Then when the driving shaft 38 rotates in the direction 80, the flex legs 18 and 22 are maintained in compression and the flex legs 20 and 24 are maintained in tension.

Figure 7:
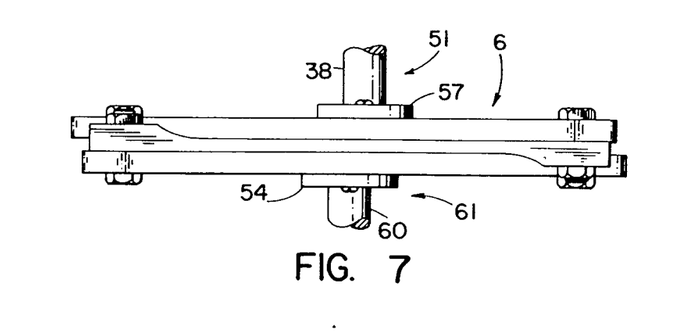
FIG. 7 is a side view of the flexible coupling of FIG. 1.

FIG. 7 shows a side view of the flexible coupling 6, the flex member 10 being slightly bent due to the slight misalignment of the shafts 38 and 60. FIG. 2 also shows that the adapter 51 flushly abuts the substantially aligned face of the corner 29 and the adapter 61 flushly abuts the substantially aligned face of the corner 30 so that the endwise spacings between the adapters 51 and 61, and the shafts 38 and 60 are minimized. Consequently, the bending moment exerted upon the flex member 10 by the adapters is minimized, and the lateral stiffness of the coupling is maximized. Note that the elongated nature of each adapter prevents it from interfering with the bolts which secure the other adapter to the flex member 10 and with the raised faces of the corner portions adjacent said other adapter.

If the flexible coupling 6 were to be assembled improperly so that the adapters 51 and 61 abut the raised faces of the corner portions instead of the substantially aligned faces of the corner portions of the flex member 10, the spacing between the adapters 51 and 61 would be greater than if the flexible coupling was properly assembled. Thus, a visual inspection or measurement of the spacing provides a means to check the assembly orientation.

Figure 8:
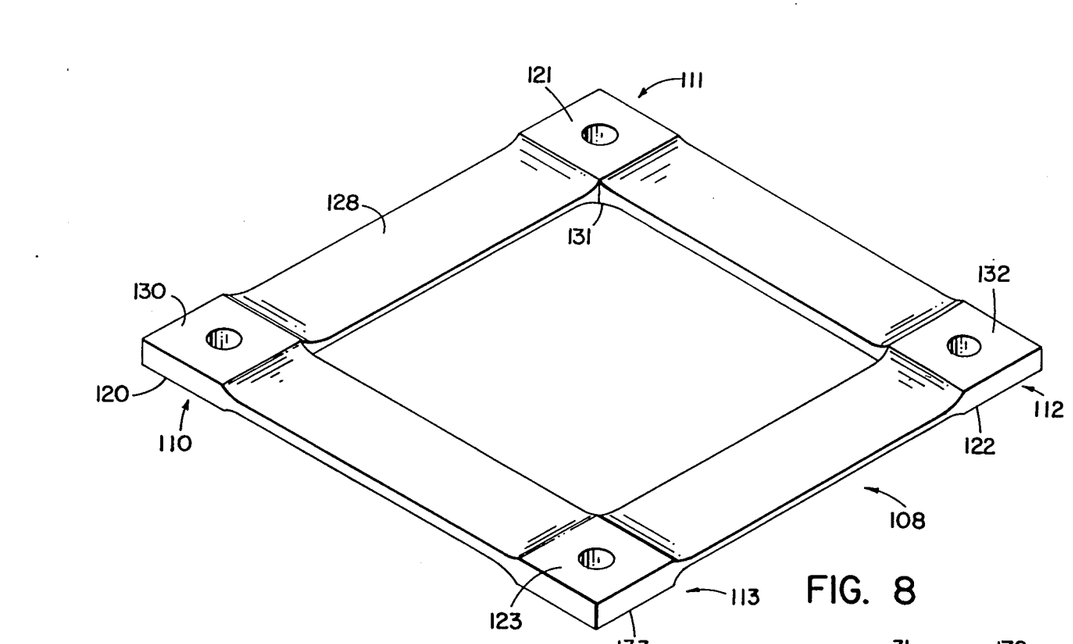
FIG. 8 is a perspective view of another flex member embodying the invention.

FIGS. 8 and 9 show another flex member generally designated 108 embodying the invention, which member is identical to the flex member 10 except that the corner portions 110, 111, 112, and 113 of the flex member 108 have faces 120, 121, 122, and 123 respectively, opposite the substantially raised faces 130, 131, 132, and 133, which are slightly raised due to slight thickening of the corner portions. The substantially raised faces 130, 131, 132, and 133 are identical to those of the flex member 10, both being created by a thickening of the corner portion. The flex member 108 may be combined with the adapters 51 and 61 to form a flexible, rotary coupling, the adapter 51 abutting and attaching to the flex member 108 at the slightly raised corner portions, faces 120 and 122, and the adapter 61 abutting and attaching to the flex member 108 at the slightly raised faces 121 and 123. FIG. 9 shows a side view of a flex leg 128 of the flex member 108. For purposes of this patent application, the slightly raised faces 120, 121, 122, and 123 are considered to be "substantially aligned" with adjacent faces of adjacent flex legs.

The flex member 108 provides the advantage of assembly orientation verification and much of the performance advantage offered by the flex member 10 described above, and when assembled and installed, may flex without the adapters interfering with the flex legs because the adapters are slightly offset from the flex legs due to the slight offset of the corner portion faces which the adapters abut.

Figure 10:
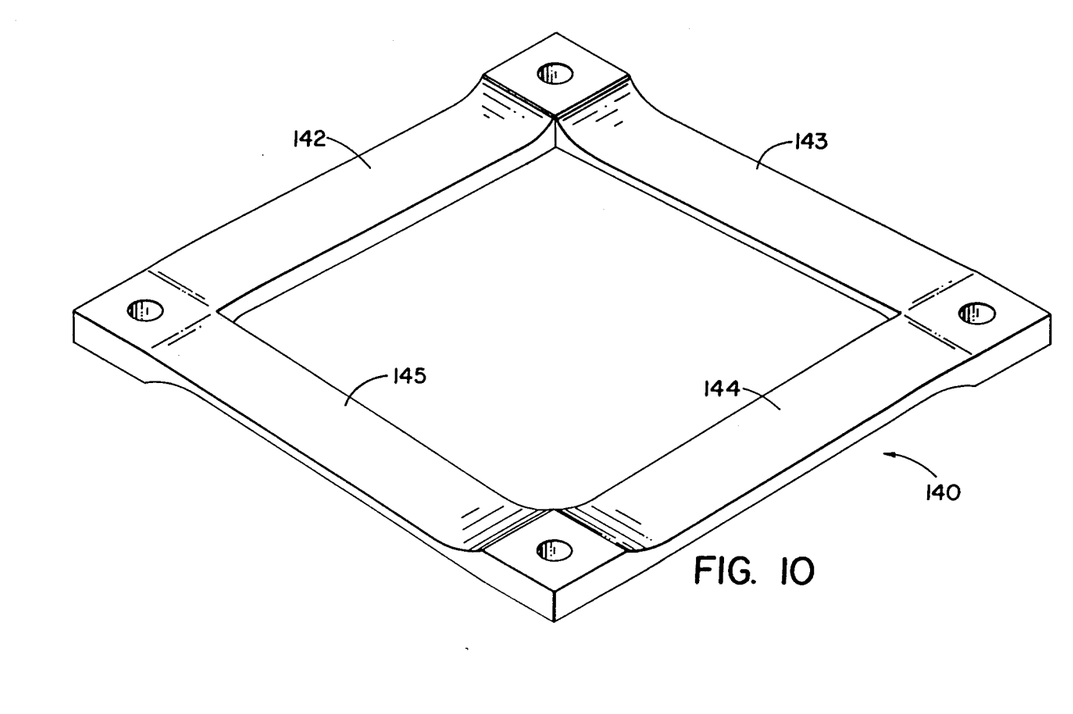
FIG. 10 is a perspective view of still another flex member embodying the invention.
Figure 11:
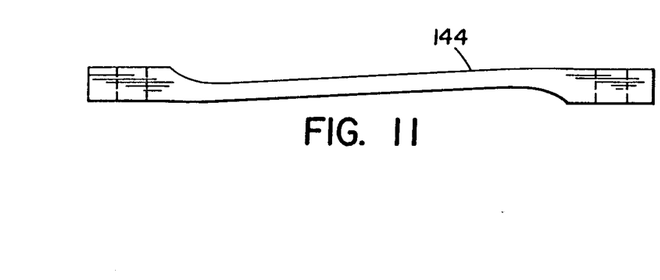
FIG. 11 is a side view of a flex leg and adjacent corner portions of the flex member of FIG. 10.

FIGS. 10 and 11 show still another flex member generally designated 140 embodying the invention, which member is similar to the flex member 10 except that each flex leg 142, 143, 144, and 145 of the flex member 140 is angled relative to the flat face of each corner portion so that the flat faces of corner portions at opposite ends of a flex leg lie in displaced, generally parallel planes. The flex member 140 may be combined with adapters such as the adapters 51 and 61 to form a flexible, rotary coupling. FIG. 11 shows the flex leg 144 of the flex member 140.

Figure 12:
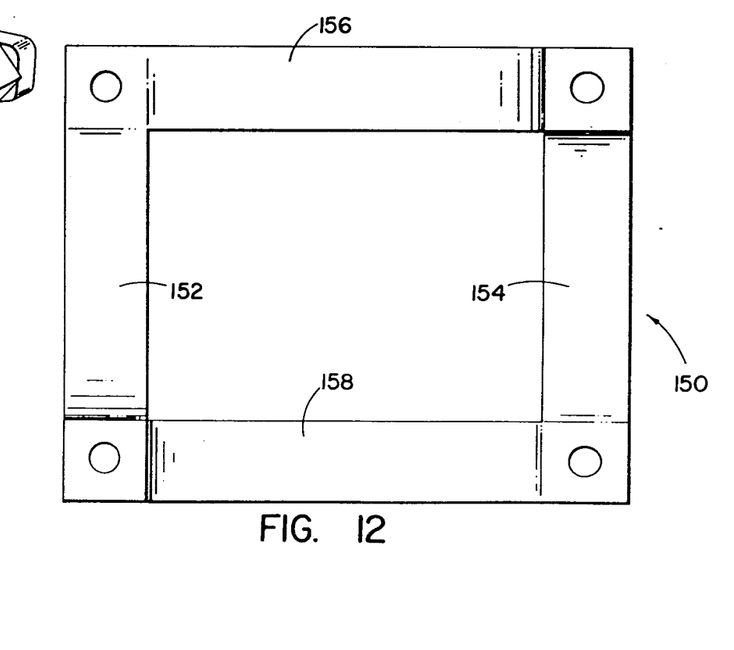
FIG. 12 is a top view of yet another flex member embodying the invention.

Yet another flex member embodying the invention generally designated 150 is shown in FIG. 12, which member is identical to the flex member 10 except that the flex member 150 is rectangular. Compressional flex legs 152 and 154 are shorter than tensional flex legs 156 and 158 to resist bowing. The compressional flex legs of the flex member 150, if desired, may be made thicker than the tensional flex legs of the flex member 150.

By the foregoing, improved flex members and flexible couplings used to couple two rotatable parts and accommodate misalignment have been disclosed. However, numerous modifications and substitutions may be made without deviating from the scope of the invention.

For example, the flex member 10 may also be constructed such that the substantially aligned faces gently slope from the adjacent face of the adjacent compressional leg to the adjacent face of the adjacent tensional leg, which is thinner, so that the substantially aligned faces are flush with the adjacent face of the adjacent compressional leg and the adjacent face of the adjacent tensional leg.

In addition, other types of symmetrical or asymmetrical flex members may utilize the corner portions shown in the figures in order to decrease the endwise spacing between a driving and driven shaft and the bending moment on the flex member, and if the flex member is asymmetrical, to indicate a correct assembly or installation orientation.

Also, all of the flex legs of the flex member 10 may be made to have the same width. In addition, the corner portions shown in the figures may also be utilized in conjunction with a flex member, such as shown in U.S. Pat. No. 4,385,895, in which the flex legs are manufactured to have a bow.

Any of the above-described flex members may be distributed apart from any adapters, and any such rectangular flex members may be used in combination with other such flex members arranged in an angularly staggered, face-to-face relation.

I claim:

1. A flex member used to rotatably couple two rotatable parts and to provide for some degree of angular and axial misalignment between said parts, said member comprising:
   four corner portions each having two corner faces facing in opposite axial directions so that in total said flex member has a first pair of diagonally opposite corner faces and a second pair of diagonally opposite corner faces facing in one axial direction and a third pair and a fourth pair of diagonally opposite corner faces facing in the opposite axial direction, and
   four substantially flat flex legs each extending between and integrally connected to two of said four corner portions to give said flex member a generally quadrilateral shape, two opposite ones of said flex legs being parallel to each other, and the other two opposite ones of said flex legs being parallel to each other,
   said first and third pairs of corner faces being located on the same two of said corner portions,
   said first pair of corner faces being located in a first plane, said second pair of corner faces being located in a second plane, said third pair of corner faces being located in a third plane, and said fourth pair of corner faces being located in a fourth plane, said first, second, third and fourth planes being parallel to one another, and
   said first and fourth planes being spaced from one another by an axial spacing less than the spacing between said second and third planes.

2. A flex member as defined in claim 1 further characterized by said four flex legs being substantially co-planar with one another.

3. A flex member as set forth in claim 1 wherein the spacing between said first and fourth planes is at least one fourth less than the spacing between said second and third planes.

4. A flex member as defined in claim 1 further characterized by two of said flex legs opposite from one another having a characteristic shape different from that of the other two of said legs.

5. A flex member as defined in claim 4 further characterized by said difference in characteristic shape of said legs being such that two opposite ones of said legs are stronger in compression than the other two of said legs.

6. A flex member as defined in claim 4 further characterized by said difference in characteristic shape being a difference in cross sectional shape.

7. A flex member as defined in claim 4 further characterized by said difference in characteristic shape being such that two opposite ones of said legs are axially thinner than the other two of said legs.

8. A flex member as set forth in claim 7 wherein each corner face of said first and fourth pairs of corner faces is aligned with the adjacent face of the adjoining, thicker flex leg.

9. A flex member used to rotatably couple two rotatable parts and to provide for some degree of misalignment between said rotatable parts, said member comprising:
   four corner portions each having two faces facing in opposite axial directions, and
   four flex legs, each leg having two faces facing in generally opposite axial directions,
   said flex legs being integrally connected to one another through said four corner portions in quadrilateral arrangement, each corner portion being thicker than the adjoining flex legs, one of said faces of each corner portion being substantially aligned with the adjacent face of at least one of the adjoining flex legs and the other face of each corner portion being raised and offset by a thickening of said corner portion from the adjacent faces of both of the adjoining flex legs, the raised and offset face of each corner portion being more raised and offset from the faces of the adjoining flex legs than is the substantially aligned face of the corner portion raised and offset from the faces of the adjoining flex legs, and
   said corner portions being arranged so that on one axial side of said flex member two diagonally opposite corner faces are ones substantially aligned with the adjacent face of at least one of the adjoining flex legs and the other two diagonally opposite corner faces are ones which are raised and offset from the adjacent faces of both of the adjoining flex legs.

10. The flex member set forth in claim 9 wherein said four flex legs and said four corner portions are connected as a square.

11. The flex member set forth in claim 9 wherein said four flex legs are generally planar with one another.

12. The flex member set forth in claim 9 wherein each flex leg is generally flat.

13. The flex member set forth in claim 9 wherein each corner portion has an aperture passing through both said faces of said corner portion.

14. The flex member set forth in claim 9 wherein said corner portions are at least fifty percent thicker than the thickest flex leg.

15. A flex member as set forth in claim 9 wherein one flex leg adjoining a corner portion is thicker than the other flex leg adjoining said corner portion, and one face of said corner portion is aligned with the face of the thicker, adjoining leg and the other face of said corner portion is raised and offset from the faces of both adjoining flex legs.

16. The flex member set forth in claim 9 wherein two opposite flex legs are shaped differently than the other two flex legs.

17. The flex member set forth in claim 16 wherein said two opposite flex legs are thicker than said other two flex legs.

18. A flex member as set forth in claim 17 wherein one face of each corner portion is aligned with the adjacent face of the thicker, adjoining flex leg and the other face of the other corner portion is raised and offset from the faces of both adjoining flex legs.

19. The flex member set forth in claim 16 wherein said two opposite flex legs are longer than said other two flex legs.

20. The flex member set forth in claim 16 wherein said two opposite flex legs are wider than said other two flex legs.

21. A flexible, rotary coupling for coupling two rotatable parts and being able to accommodate misalignment between said two rotatable parts, said coupling comprising:
a flex member including four portions and four flex legs, each leg having two faces facing in generally opposite axial directions,
said flex legs being integrally connected to one another through said four corner portions in quadrilateral arrangement, each corner portion being thicker than the adjoining flex legs, one of said faces of each corner portion being aligned with the adjacent face of at least one of the adjoining flex legs and the other face of each corner portion being raised and offset by a thickening of said corner portion from the adjacent faces of both of the adjoining flex legs,
said corner portions being arranged so that on one axial side of said flex member two diagonally opposite corner faces are ones aligned with the adjacent face of at least one of the adjoining flex legs and the other two diagonally opposite corner faces are ones which are raised and offset from the adjacent faces of both of the adjoining flex legs, and further comprising
first adapter means for interfacing one of said rotatable parts to the first said two diagonally opposed corner portions, said adapter means being attached to the first said two diagonally opposed corner portions, and
second adapter means for interfacing the other said rotatable part to said other two diagonally opposed corner portions, said adapter means being attached to said other two diagonally opposed corner portions.

22. A flex member as set forth in claim 21 wherein one flex leg adjoining a corner portion is thicker than the other flex leg adjoining said corner portion, and one face of said corner portion is aligned with the adjacent face of the adjoining, thicker leg and the other face of said corner portion is raised and offset from the faces of both adjoining flex legs.

23. The flex member set forth in claim 21 wherein said first adapter means abuts said two aligned the first said two diagonally opposed corner portions.

24. The flex member set forth in claim 23 wherein said second adapter means abuts said two aligned faces of said other two diagonally opposed corner portions.

25. The flex member set forth in claim 23 wherein said flex legs of said flex member are generally planar with one another.

26. The flex member set forth in claim 23 wherein two opposite flex legs have one shape and the other flex legs have another shape.

27. The flex member set forth in claim 23 wherein said corner portions are at least fifty percent thicker than the thickest flex leg.

28. A flex member used to rotatably couple two rotatable parts and to provide for some degree of misalignment between said rotatable parts, said member comprising:
a plurality of corner portions each having two faces facing in opposite axial directions, and
a plurality of flex legs, each leg having two faces facing in generally opposite axial directions,
said flex legs being integrally connected to one another through said corner portions in polygonal arrangement, each corner portion being thicker than the adjoining flex legs, one of said faces of each corner portion being substantially aligned with the adjacent face of at least one of the adjoining flex legs and the other face of each corner portion being raised and offset by a thickening of said corner portion from the adjacent faces of both of the adjoining flex legs, the raised and offset face of each corner portion being more raised and offset from the faces of the adjoining flex legs than is the substantially aligned face of the corner portion raised and offset from the faces of the adjoining flex legs, and
said corner portions being arranged so that on one axial side of said flex member two diagonally opposite corner faces are ones substantially aligned with the adjacent face of at least one of the adjoining flex legs and the other two diagonally opposite corner faces are ones which are offset from the adjacent faces of both of the adjoining flex legs.

29. A flex member as set forth in claim 23 wherein one flex leg adjoining a corner portion is thicker than the other flex leg adjoining said corner portion, and one face of said corner portion is aligned with the adjacent face of the thicker, adjoining leg and the other face of said corner portion is raised and offset from the faces of both adjoining flex legs.

30. A flexible, rotary coupling for coupling two rotatable parts and accommodating misalignment between said two rotatable parts, said coupling comprising:
a flex member including four corner portions each having two corner faces facing in opposite axial directions so that in total said flex member has a first pair of diagonally opposite corner faces and a second pair of diagonally opposite corner faces facing in one axial direction and a third and fourth pair of diagonally opposite corner faces facing in the opposite axial direction, and four substantially flat flex legs each extending between and integrally connected to two of said four corner portions in a common plane to give said flex member a planar, generally quadrilateral shape, said first and third pairs of corner faces being located on the same two of said corner portions, said first pair of corner faces being located in a first plane, said second pair of corner faces being located in a second plane, said third pair of corner faces being located in a third plane, and said fourth pair of corner faces being located in a fourth plane, said first, second, third and fourth planes being generally parallel to one another, and said first and fourth planes being spaced from one another by an axial spacing less than the spacing between said second and third planes, and further comprising first adapter means for interfacing one of said rotatable parts to said first pair of diagonally opposite corner faces, and second adapter means for interfacing the other said rotatable part to said fourth pair of diagonally opposite corner faces.

* * * * *